United States Patent [19]

Powers et al.

[11] Patent Number: 5,524,655
[45] Date of Patent: Jun. 11, 1996

[54] PRECHARGE MECHANISM FOR VACUUM TOILET SYSTEM

[75] Inventors: Theodore C. Powers, Winnebago; George T. Beatty, Rockford; William P. Mulligan, Belvidere, all of Ill.

[73] Assignee: Envirovac Inc., Rockford, Ill.

[21] Appl. No.: 416,010

[22] Filed: Apr. 4, 1995

[51] Int. Cl.⁶ ............................................. B08B 9/08
[52] U.S. Cl. ..................... 134/166 R; 134/169 R; 134/168 R; 134/169 A
[58] Field of Search ................. 134/166 R, 169 R, 134/104.1, 104.2, 99.1, 167 R, 168 R, 169 A

[56] References Cited

U.S. PATENT DOCUMENTS

| | | |
|---|---|---|
| 3,062,227 | 11/1962 | Sodenberg .................... 134/166 C |
| 3,642,013 | 2/1972 | Thiersticn ........................ 134/152 |
| 3,675,774 | 7/1972 | Roberts et al. . | 
| 4,015,613 | 4/1977 | Papworth ......................... 134/111 |
| 4,054,149 | 10/1977 | Nelson ......................... 134/167 C |
| 4,469,143 | 9/1984 | Vazin .............................. 134/166 R |
| 4,584,726 | 4/1986 | Grills et al. . | 
| 4,882,792 | 11/1989 | Vincent . | 
| 4,905,325 | 3/1990 | Colditz . | 
| 4,918,769 | 4/1990 | Gandini . | 
| 4,991,608 | 2/1991 | Schweiger .................... 134/111 |
| 5,282,889 | 2/1994 | Franklin .................... 134/169 R |

*Primary Examiner*—Frankie L. Stinson
*Attorney, Agent, or Firm*—Smith-Hill and Bedell

[57] ABSTRACT

A sewage collection and disposal system for a passenger transport vehicle comprises a sewage collection tank having a sewage inlet connected to a sewer pipe of the vehicle and a sewage discharge outlet for draining sewage from the sewage collection tank under control of a drain valve. A cleaning liquid supply pipe connects a source of cleaning liquid under pressure to a cleaning liquid supply connection for introducing cleaning liquid into the sewage collection tank. A precharge tank that is in fluid communication with the sewage collection tank is also connected to the cleaning liquid supply pipe, whereby cleaning liquid is supplied to the precharge tank when cleaning liquid is supplied to the cleaning liquid supply member. A blower establishes a partial vacuum in the sewage collection tank when the drain valve is closed, whereby pressure difference between the precharge tank and the sewage collection tank forces cleaning liquid present in the precharge tank into the sewage collection tank.

7 Claims, 1 Drawing Sheet

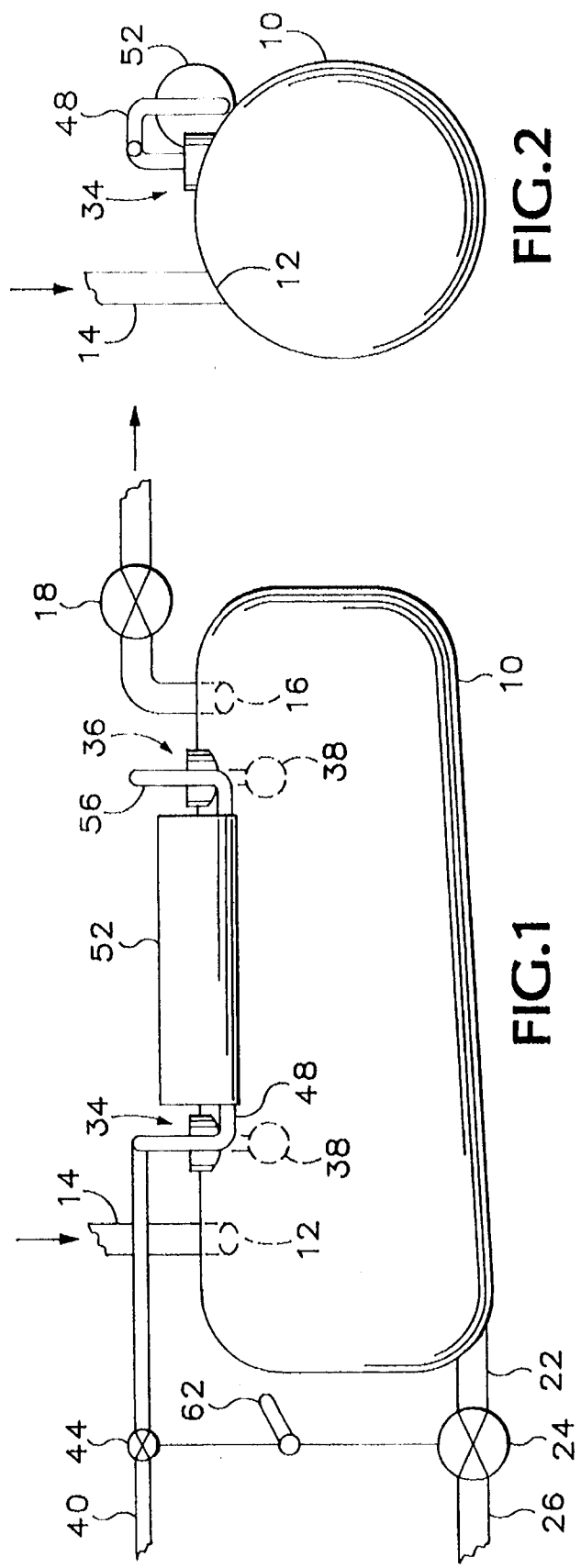

5,524,655

PRECHARGE MECHANISM FOR VACUUM TOILET SYSTEM

BACKGROUND OF THE INVENTION

A conventional passenger transport aircraft includes a toilet system that comprises a sewer pipe connecting at least one toilet bowl to a sewage collection tank. While the aircraft is in flight, sewage is collected in the sewage collection tank, and during servicing of the aircraft between flights the sewage collection tank is emptied into a municipal sewer for delivery to a sewage treatment facility. When the tank has been drained, the interior of the tank is sprayed with a cleaning livid, which contains bactericide, to remove residual sewage.

It is conventional to provide a precharge of bactericide in the sewage collection tank of a passenger transport aircraft during pre-flight servicing. Since the cleaning liquid contains bactericide, the precharge may be provided by closing the drain valve of the sewage collection tank before the valve that controls supply of cleaning livid is closed; the cleaning livid that accumulates in the tank before supply of cleaning livid is terminated forms the precharge.

The quantity of precharge livid present in the sewage collection tank when pre-flight servicing of the aircraft is complete depends on the interval between closing the drain valve and closing the cleaning livid supply valve. Moreover, the quantity of cleaning livid will also depend on the pressure at which the cleaning livid is supplied by the service equipment. Thus, the volume of the precharge is subject to variation. Too little precharge livid may limit the effectiveness of the desired germicidal action, whereas too much precharge livid limits the usable capacity of the sewage collection tank and may render the contents of the tank unsuitable for discharge to a sewage treatment facility. It is generally considered desirable that the quantity of precharge livid should be approximately 8 to 10 liters.

U.S. Pat. No. 4,584,726 discloses a precharge system in which the sewage collection tank drain valve is opened by the pressure of cleaning liquid, and closes automatically when supply of cleaning liquid is interrupted. A precharge of controlled volume is retained in a precharge tank after supply of cleaning liquid is interrupted and the drain valve closes. The precharge tank is located above the sewage collection tank and so the precharge drains under Gravity from the precharge tank into the sewage collection tank.

The arrangement shown in U.S. Pat. No. 4,584,726 is subject to disadvantage, in that it requires that the precharge tank be located above the sewage collection tank.

SUMMARY OF THE INVENTION

In accordance with the present invention there is provided a sewage collection and disposal system for a passenger transport vehicle, comprising a sewage collection tank having a sewage inlet connected to a sewer pipe of the vehicle and a sewage discharge outlet for draining sewage from the sewage collection tank, a drain valve for controlling draining of sewage from the sewage collection tank byway of the sewage discharge outlet, at least one cleaning liquid supply member for introducing cleaning liquid into the sewage collection tank, a cleaning liquid supply pipe for connecting a source of cleaning liquid under pressure to the cleaning liquid supply member, a precharge tank connected to the cleaning liquid supply pipe, whereby cleaning liquid is supplied to the precharge tank when cleaning liquid is supplied to the cleaning liquid supply member, the precharge tank being in fluid communication with the sewage collection tank, and a blower means for establishing a partial vacuum in the sewage collection tank when the drain valve is closed, whereby pressure difference between the precharge tank and the sewage collection tank forces cleaning liquid present in the precharge tank into the sewage collection tank.

BRIEF DESCRIPTION OF THE DRAWINGS

For a better understanding of the invention, and to show how the same may be carried into effect, reference will now be made, by way of example, to the accompanying drawings, in which FIG. 1 is a partial schematic view of a sewage collection and disposal system of a passenger transport aircraft, and shows a side view of a sewage collection tank, and FIG. 2 is an end view of the sewage collection tank.

DETAILED DESCRIPTION

The illustrated sewage collection and disposal system comprises a sewage collection tank 10 having a sewage inlet 12 connected to a sewer pipe 14 of an aircraft toilet system, and an air outlet 16 connected to a blower 18 for establishing partial vacuum in the tank. The sewage inlet and air outlet, which are shown only schematically in the drawings because the structure of these components may be conventional, may be integrated in a single inlet/outlet fitting. The tank has a drain outlet 22 connected through a drain valve 24 to a drain pipe 26 that extends to an outlet at the service panel of the aircraft. At the top of the tank, there are two spray nozzle assemblies 34 and 36, each of which has at least one spray nozzle 38 that opens into the tank 10. A cleaning liquid supply pipe 40 extends from the service panel and is connected through a valve 44 both to the spray nozzle assembly 34 and to a branch pipe 48. A source of cleaning liquid under pressure (not shown) is connected to the pipe 40 when the aircraft is being serviced. The branch pipe 48 is connected through a precharge tank 52 and a secondary pipe 56 to the spray nozzle assembly 36. The two spray nozzle assemblies may be as shown in U.S. patent application Ser. No. 08/252,316 filed Jun. 1, 1994, the disclosure of which is hereby incorporated by reference herein. When the valve 44 is opened, the cleaning liquid is supplied to the spray nozzle assembly 34 and to the tank 52. The flow resistance of the spray nozzles 38 is quite high, and the pressure at which the cleaning liquid is supplied is quite high (about 60 psi gauge) and so cleaning liquid accumulates in the precharge tank beneath a cushion of air under pressure. Some of the cleaning liquid flows from the tank through the pipe 56 to the spray nozzle assembly, and air is entrained in the flow from the tank 52 and is thereby removed from the tank 52. The pump continues to supply cleaning liquid through the pipe 40, and the cleaning liquid is sprayed into the sewage collection tank through the two spray nozzles.

The valves 24 and 44 are mechanically linked to a handle 62 that is accessible at the service panel. When the two valves are closed and the handle 62 is moved toward its open position, the valve 24 opens before the handle reaches the position at which the valve 44 opens, and so the sewage collection tank can be drained before supply of cleaning liquid commences. When the service operator is satisfied that the sewage collection tank is substantially empty, he moves the handle 62 to the position at which the valve 44 opens, and cleaning liquid is then supplied. So long as the valve 44 is open, the valve 24 remains open.

When the draining and cleaning operation is completed, the operator moves the handle 62 to close the valve 44 and shut off supply of cleaning liquid. This motion of the handle also causes the valve 24 to close. Since the pipe 40 is no longer connected to the source of pressurized cleaning liquid, the pressure in the tank 52 equalizes with that in the sewage collection tank by displacement of cleaning liquid from the precharge tank into the sewage collection tank by way of the spray nozzles. The service panel can then be disconnected from the municipal sewer and the source of cleaning liquid. When the aircraft is brought into operation, the blower 18 is energized, and a partial vacuum is created in the sewage collection tank. This causes additional cleaning liquid to be displaced from the cleaning liquid from the precharge tank 52 into the sewage collection tank. Preferably, the volume of the precharge tank is selected so that the volume of cleaning liquid present in the precharge tank when the valves are closed is about 9 liters.

Use of the precharge tank 52 ensures that the desired quantity of cleaning liquid is introduced into the sewage collection tank. By using the pressure in the precharge tank to displace the precharge from the precharge tank into the sewage collection tank, it is unnecessary to position the tanks to allow gravity flow of cleaning liquid from the precharge tank into the sewage collection tank.

A check valve is provided in the pipe 40 to prevent backflow of cleaning liquid in the event that the pump is turned off before the valve 44 is closed.

In a modification of the system described above, the precharge tank is provided with a check valve at its highest point to allow air to enter the precharge tank when the pressure inside the precharge tank is below ambient. This ensures that substantially all cleaning liquid will be forced from the precharge tank when the blower is first operated. If the check valve is vented into the pressurized aircraft cabin, the check valve will remain open while the aircraft is in operation and place an extra load on the aircraft pressurization system, but the extra load is rather small. Alternatively, the check valve could be plumbed to the exterior of the aircraft, in which case the check valve will remain closed when the aircraft is at its normal operating altitude.

In another modification, a float valve is used instead of a check valve. The float valve allows air to be displaced from the precharge tank by cleaning liquid and so the precharge tank is filled with cleaning liquid. When the blower 18 is started, all the cleaning liquid is forced from the precharge tank into the sewage collection tank. The valve will remain open unless the precharge tank is full of liquid, but this is not a substantial disadvantage, especially if the valve is plumbed to the exterior of the aircraft and accordingly leakage of cleaning liquid past the valve during the servicing of the aircraft can be seen by the service personnel.

It will be appreciated that the invention is not restricted to the particular embodiments that have been described, and that variations may be made therein without departing from the scope of the invention as defined in the appended claims and equivalents thereof.

We claim:

1. A sewage collection and disposal system for a passenger transport vehicle, comprising:
   - a sewage collection tank having a sewage inlet connected to a sewer pipe of the vehicle and a sewage discharge outlet for draining sewage from the sewage collection tank,
   - a drain valve for controlling draining of sewage from the sewage collection tank by way of the sewage discharge outlet,
   - at least one cleaning liquid supply member for introducing cleaning liquid into the sewage collection tank,
   - a cleaning liquid supply pipe for connecting a source of cleaning liquid under pressure to the cleaning liquid supply member,
   - a precharge tank connected to the cleaning liquid supply pipe, whereby cleaning liquid is supplied to the precharge tank when cleaning liquid is supplied to the cleaning liquid supply member, the precharge tank being in fluid communication with the sewage collection tank, and
   - a blower means for establishing a partial vacuum in the sewage collection tank when the drain valve is closed, whereby pressure difference between the precharge tank and the sewage collection tank forces cleaning liquid present in the precharge tank into the sewage collection tank.

2. A system according to claim 1, further comprising a cleaning liquid supply valve for controlling supply of cleaning liquid through the cleaning liquid supply pipe.

3. A system according to claim 2, wherein the cleaning liquid supply valve and the drain valve are operatively coupled so that when the cleaning liquid supply valve is open, the drain valve also is open, and when the cleaning liquid supply valve closes, the drain valve also closes.

4. A system according to claim 1, wherein the precharge tank has a vent: opening and the system further comprises a vent means associated with the vent opening of the precharge tank for allowing exchange of air between the precharge tank and ambient atmosphere while preventing cleaning liquid from leaving the precharge tank by way of the vent opening.

5. A system according to claim 4, wherein the vent means comprises a float valve.

6. A system according to claim 4, wherein the vent means comprises a check valve.

7. A system according to claim 1, comprising at least one toilet bowl and a sewer valve connected between the toilet bowl and the sewer pipe.

* * * * *